United States Patent [19]

Best

[11] 4,417,314

[45] Nov. 22, 1983

[54] PARALLEL OPERATING MODE ARITHMETIC LOGIC UNIT APPARATUS

[75] Inventor: David W. Best, Marion, Iowa

[73] Assignee: Rockwell International Corporation, El Segundo, Calif.

[21] Appl. No.: 283,263

[22] Filed: Jul. 14, 1981

[51] Int. Cl.³ .............................................. G06F 7/50
[52] U.S. Cl. ..................................... 364/716; 364/785
[58] Field of Search ........................ 364/716, 785, 786

[56] References Cited

U.S. PATENT DOCUMENTS

| | | | |
|---|---|---|---|
| 3,767,906 | 10/1973 | Pryor | 364/716 |
| 4,229,803 | 10/1980 | Rhodes | 364/716 X |
| 4,263,660 | 4/1981 | Prioste | 364/716 |
| 4,349,888 | 9/1982 | Smith | 364/716 |

*Primary Examiner*—David H. Malzahn
*Attorney, Agent, or Firm*—Bruce C. Lutz; Howard R. Greenberg; H. Frederick Hamann

[57] ABSTRACT

Apparatus is presented for logically combining two input signals in parallel operations to provide AND and OR as well as Exclusive OR outputs as part of the ALU function in a digital computer. The carry function is used in combination with the already generated signals of AND, OR and Exclusive OR to provide a carry output signal and a SUM signal through logic combining techniques. Thus, the entire ALU output is obtained in two stages of time delay and a great savings in components. In some computers, the outputs need to be passed through a four to one multiplexer to select the desired output.

11 Claims, 4 Drawing Figures

PARALLEL OPERATING MODE ARITHMETIC LOGIC UNIT APPARATUS

INVENTION

The present invention is concerned generally with electronics and more specifically with ALU's. Even more specifically, the present invention provides an improved parallel mode ALU utilizing fewer components and providing greater speed than that obtained in the prior art.

The present invention incorporates logical gating circuits to simultaneously combine two input signals to provide logical OR, logical AND and logically exclusive OR signals in a manner outlined in my co-pending application Ser. Nos. 283,269, 283,270 and 283,268 filed on July 14, 1981 and assigned to the same assignee as the present invention.

Although it is realized that there are other ALU's which perform in a somewhat parallel fashion in providing outputs, it is believed that the present invention provides these functions using less components and generates the output in a minimum amount of time.

It is therefore an object of the present invention to provide improved ALU apparatus.

Other objects and advantages of the invention may be ascertained from a reading of the specification and appended claims in conjunction with the drawings, wherein:

DETAILED DESCRIPTION

Figure 1:
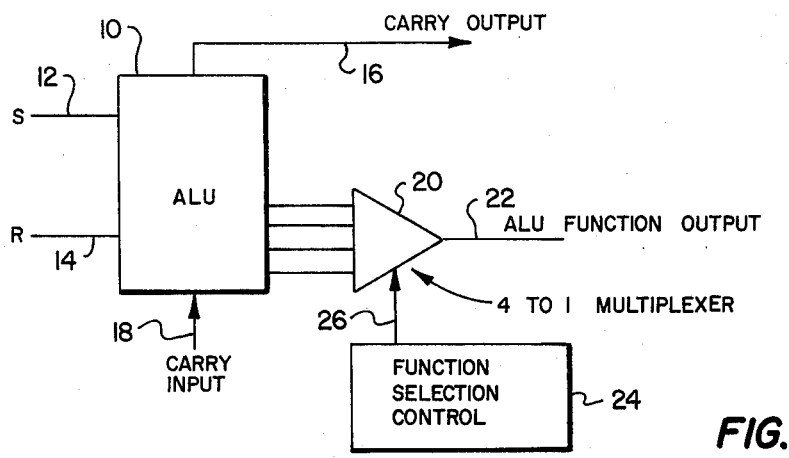
FIG. 1 is a block diagram of the overall inventive concept.

In FIG. 1 an ALU block 10 has S and R inputs 12 and 14 respectively and a CARRY output 16. The ALU also has a CARRY input signal lead 18. A four-to-one multiplexer 20 receives four outputs from the ALU and provides an output on a lead 22. A control signal to the multiplexer is input from a block 24 on a lead 26. Block 24 is a function select control block for controlling the four-to-one multiplexer block 20 whereby the ALU selected function is provided on output lead 22.

Figure 2:
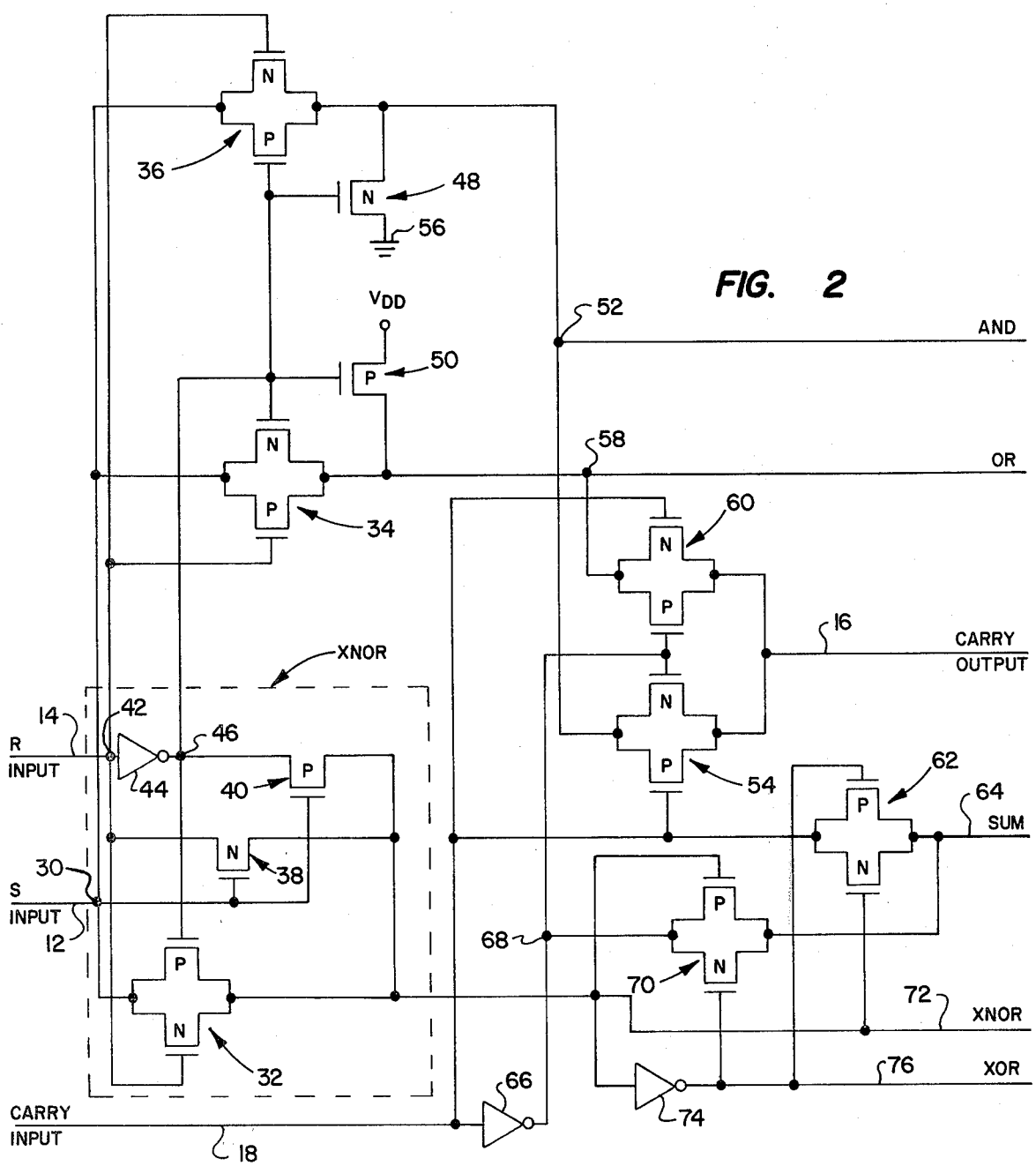
FIG. 2 is a detailed schematic illustrating one embodiment of the inventive concept.

In FIG. 2 the main designation numbers shown in FIG. 1 are repeated in FIG. 2 and also repeated in the following FIGS. 3 and 4.

In FIG. 2 the S input lead 12 is connected to a junction point 30 which provides connections to inputs of transmission gates or gating means 32, 34 and 36. Junction point 30 is also connected to provide control signals to further transfer gates or gating means 38 and 40. The R input 14 is connected to a junction point 42 where the signal is inverted in an inverter 44 and supplied to a junction point 46. The junction point 42 is tied to leads which control one control lead of each of transmission gates 32, 34 and 36 as shown. The junction point 42 is also utilized to provide input signals to the transfer gate 38. The junction point 46 is then utilized to provide a further control signal to transmission gates 32, 34 and 36 as well as to N FET or gating means 48 and P FET or gating means 50. The transmission gate 36 has an output which is connected to a junction point 52 which provides the AND output. This AND output is also utilized to provide an input to a transmission gate or gating means 54 whose output is connected to lead 16 and is the carry output. N FET gate 48 is connected between junction point 52 and ground 56 whereby when it is in an ON condition, the junction point 52 is effectively connected to ground. An output of gate 34 is connected to a junction point 58 which provides the OR output and also provides an input to a transmission gate or gating means 60, as a signal input. An output of gate 60 is connected to lead 16 as the CARRY output signal from the apparatus. The CARRY input lead 18 is connected to control a portion of each of the transmission gates 54 and 60 as well as providing an input signal to a transmission gate or gating means 62. An output of transmission gate 62 is connected to an output lead 64 which provides SUM output signals. The CARRY input on 18 is inverted in an inverter 66 and provided to a junction point 68 which provides control signals to the other control input of transmission gates 54 and 60 as well as providing an input signal to a transmission gate or gating means 70. The outputs of transmission gate 32, and transfer gates 38 and 40 are tied together to provide an exclusive NOR (XNOR) output on a lead 72. The exclusive NOR output on lead 72 provides one control input for each of gates 62 and 70. This signal is also inverted by an inverter 74 and provided on a lead 76 as the exclusive OR (XOR) output for the apparatus. The lead 76 is also provided as a second control input signal for transmission gates 62 and 70 as shown.

Figure 3:
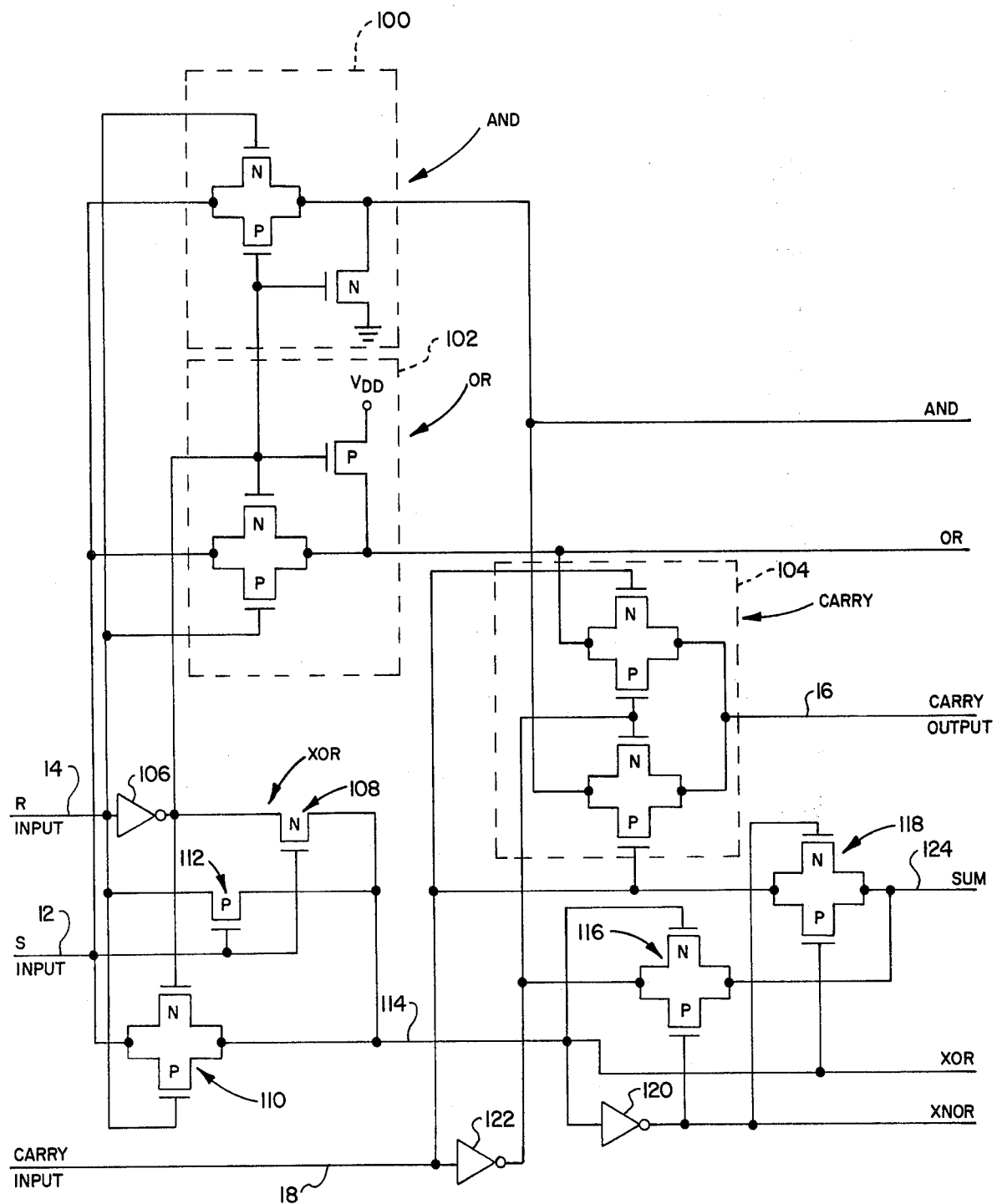
FIG. 3 is a schematic showing an alternate approach to implementing the inventive concept.

The only difference between FIG. 3 and FIG. 2 is that the circuitry in the lower left hand portion of FIG. 2 is an exclusive NOR circuit. In FIG. 3, this similarly situated circuit is an exclusive OR. Thus, in FIG. 3 the AND circuitry is labeled 100, the OR circuitry is labeled 102 and the CARRY or ripple CARRY circuit is labeled 104. The R input is supplied through an inverter 106 as previously illustrated and input to a transfer gate 108. The output of 106 is also used to provide one control signal to a transmission gate 110. The R input on 14 is used to provide the other control signal to transmission gate 110 as well as providing an signal input to transfer gate 112. The outputs of these three devices, transmission gate 110 and transfer gates 108 and 112 comprising the exclusive OR gate signal of FIG. 3 are connected to a common lead 114 which provides an exclusive OR output for the apparatus as well as providing a control signal to transmission gates 116 and 118. The exclusive OR signal on lead 114 is inverted in an inverter 120 and the output of this inverter is used to provide the other control input for transmission gates 116 and 118. The CARRY input signal on lead 18 is passed through an inverter 122 to provide the signal input to gate 116 wherein this signal may be output on SUM lead 124. The non-inverted CARRY input on lead 18 is provided as a signal input to transmission gate 118 which is also connected to output 124. If it is desired to have an exclusive NOR output, this can be obtained from the output of inverter 120.

The circuits of FIG. 2 and FIG. 3 are alike in that to obtain the SUM output, the CARRY input signal is logically switched by the value of the exclusive OR signal. The exclusive NOR signal is the logical inverse of exclusive OR. For lexical purposes of this application, the terminology in the claims pertaining to the logic values of an exclusive OR signal are intended to include the logic values of the exclusive NOR signal except as will be realized they are the complement of each other. In other words the terminology "exclusively logic combining" is intended to include either XNOR or XOR.

Figure 4:
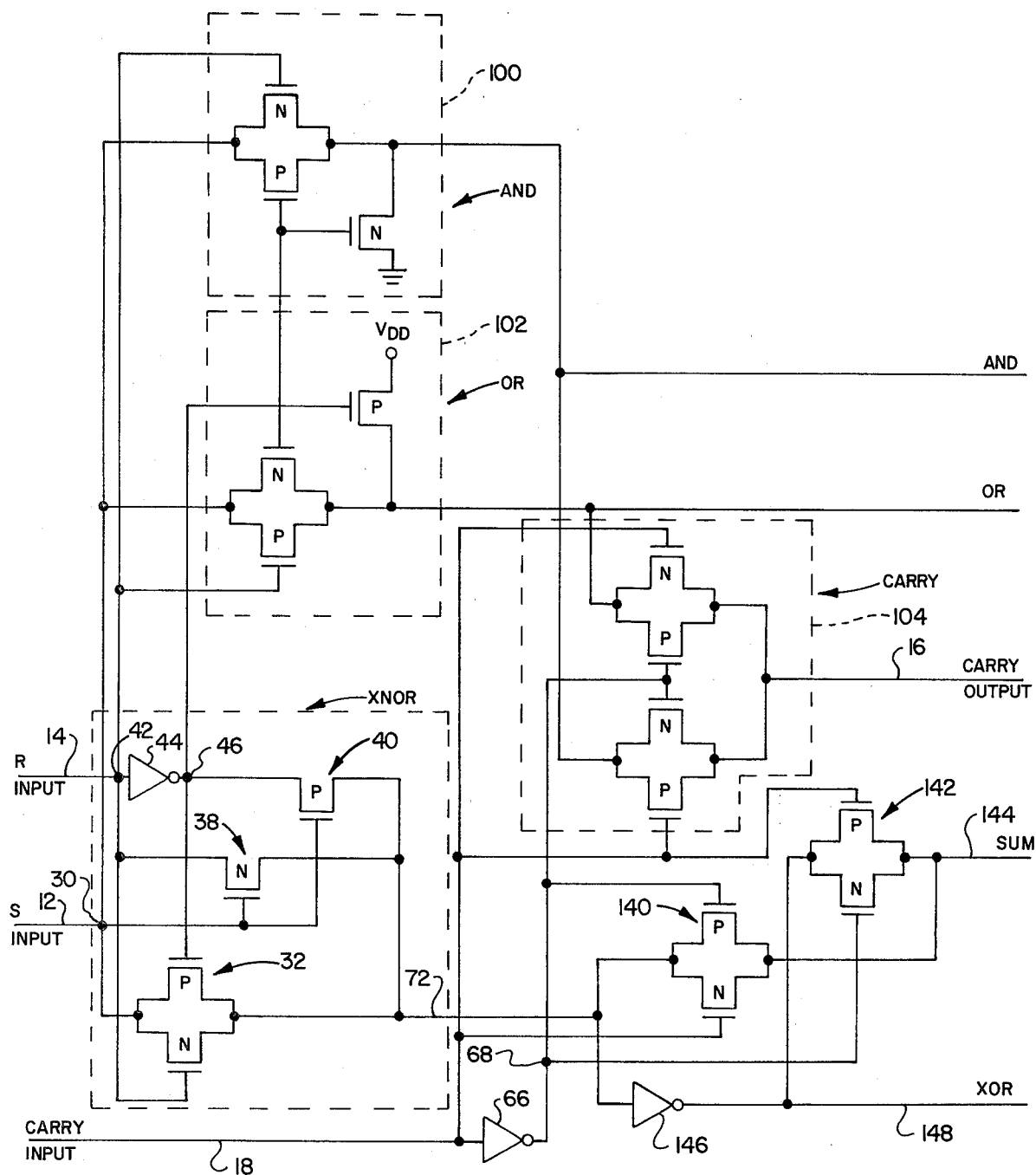
FIG. 4 is a third schematic diagram showing a further alternate approach to implementing the inventive concept.

FIG. 4 alters the technique of FIGS. 2 and 3 in that the CARRY signal is used as the control signal to pass the logic values of the exclusive OR signal. Otherwise, the blocks are the same and thus the designations for the AND, OR and CARRY circuits remain the same as shown in FIG. 3. Further, since the exclusive NOR circuit is, as illustrated, the same as in FIG. 2, the same numbers are used there.

The CARRY input signal 18 is provided as a control input to a transmission gate 140 and as a control input to transmission gate 142. The output of these two transmission gates 140 and 142 is provided to a lead 144 as the SUM output. The inverted signal appearing at junction 68 as output by inverter 66 is then connected as the second control input for transmisson gates 140 and 142. The exclusive NOR gate signal from lead 72 is utilized as a signal input to gate 140 and it is inverted by inverter 146 and supplied as a signal input to transmission gate 142. This output of inverter 146 is given a designation of 148 and is the exclusive OR output for the apparatus.

In normal ALU use, a signal of either AND, OR, SUM or Exclusive OR is used in the immediately following circuitry. In the prior art, only one of these signals is normally generated. However, when these are generated in parallel as in the present invention, a multiplexer such as 20 in FIG. 1 is utilized to select which of the outputs is to be used by the following circuitry. Such a connection would be made in conjunction with each of FIG's 2 through 4.

OPERATION

Referring first to the top portion of FIG. 2, it will be noted that the circuit contained therein is identical to that presented in the referenced AND circuit application where a control signal is utilized to pass a second signal only when it is in logic one condition. Thus, when the R input is in a logic one condition the S signal is passed so that the output is a logic one only when both the R and S inputs are a logic one.

The OR circuit comprising gates 34 and 50 provide a similar function in that the R input is used to control these two gates so that if the R input is a logic one the output is tied to a logic one condition. However, if the R input is a logic zero, the transmisson gate 34 is constructed to pass the S input whereby the output will be a logic one whenever either the R or S input is a logic one. This is described in the co-pending OR logic circuit application previously referenced.

The referenced co-pending exclusive OR logic circuit application includes a circuit for an exclusive NOR gate which operates to combine the R input and its logical complement with the S input to enable the appropriate transfer gate to pass either the R input or its complement or to enable the complementary transmission gate to pass the S input thereby forming the logical complement of the exclusive OR function. This signal as it appears at terminal 72 is inverted by the inverter 74 to form the exclusive OR output signal for the ALU. Thus, the AND, OR and Exclusive OR output signals appearing at junctions 52 and 58 and leads 76, respectively, are all formed at an essentially simultaneous time.

The SUM function output on lead 64 is performed by using the exclusive OR output and its logical complement appearing on lead 72 to enable the appropriate transmission gate 62 and 70 to pass the carry input as provided on lead 18 or its logical complement as inverted by inverter 66 to provide the addition or SUM result.

The arithmetic CARRY signals for this ALU may be propagated in a ripple fashion between bit stages by using the AND and OR outputs appearing at junction points 52 and 58, respectively, as the generate and propagate functions respectively. These signals indicate whether the current bit stage will propagate a CARRY input (the OR signal is a logic one) or generate a CARRY (the AND signal is a logic one) as output to the next bit stage in the ALU. If the CARRY input on lead 18 to a bit stage is a logical one, the complementary transmission gate 60 is enabled, whereby the logic value of the OR signal for that bit for the ALU is passed to the CARRY output lead 16 and thus to the CARRY input of the next bit stage. If the CARRY input is a logic zero on lead 18, the transmission gate 54 is enabled to pass the AND result from junction point 52 to the CARRY output 16 and thus to the carry input of the next bit stage. Thus, the operations correspond to propagating a CARRY or generating a CARRY, respectively.

As will be realized by those skilled in the art, the addition function can be speeded up by using a lookahead CARRY generator. The propagate (AND) and generate (OR) output bits of each bit stage of the ALU are then examined by the look-ahead CARRY logic. The outputs of this examination are then used as CARRY inputs to the appropriate stages of the ALU. Look-ahead CARRY signals may be injected into every ALU bit stage. The decision for using ripple carries within each group or using CARRY inputs to each ALU bit stage is set by the computational speed requirements for the digital bit processor.

It may be noted that the inverter 66 is used both for the ripple CARRY function and the SUM function, thereby eliminating one inverter which would have been required in a normal parallel operation. As implied above, the logical implementation described herein may be expanded to form an ALU of any word length simply by adding the additional bit stages necessary to form the word length or width desired. By using the disclosed design techniques, a considerable saving in number of transistors is obtained to form the ALU function while decreasing the circuit complexity and the time for obtaining the output signal thereby increasing the rate at which computations may be performed.

The circuit of FIG. 3 is substantially identical to that of FIG. 2 except that the lower left hand circuit is designed as an exclusive OR rather than an exclusive NOR. Thus, the inverter 120 is utilized to provide exclusive NOR signals rather than the exclusive OR of FIG. 2. Otherwise, the circuitry is substantially the same with the polarity of the transistors in the transmission gates 116 and 118 reversed as diagrammatically illustrated to pass the appropriate CARRY inputs to the output. Functionally, however, the SUM circuit is identical with that of FIG. 2.

FIG. 4 is slightly different than FIG. 2 in that the SUM circuit has been modified to use the CARRY inputs as the control signals while the exclusive OR and its complement exclusive NOR are the signals to be passed to the output to form a part of the ALU signal output.

Although FIG. 1 is believed self-explanatory, it may be noted that the ALU 10 can be any of the circuits of FIGS. 2 through 4 or other variations thereof falling within the scope of the claims to SUM the inputs S and R on leads 12 and 14 and logically combine the signals with the CARRY input signals on lead 18 to provide a CARRY output on lead 16 and the four normally used output signals of AND, OR, SUM and Exclusive OR. The multiplexer 20 is then used to select which one of these four will be output on lead 22 in accordance with input signals received on lead 26 from the function selection control block 24.

In summary, the present inventive concept utilizes a parallel output approach to designing an ALU for the purpose of increasing the speed of operation and incidently reducing the number of parts and circuit complexity along with total design cost. While three embodiments are illustrated for the ALU, it is to be realized that the ALU can be designed differently and still fall within the scope of the claims appended hereto wherein,

I claim:

1. Arithmetic logic unit apparatus comprising, in combination:
   first signal input means;
   second signal input means;
   carry signal input means;
   AND, OR and Exclusive NOR (XNOR) gate means, connected to said first and second signal input means, for receiving first and second signals and providing parallel output AND, OR and XNOR signals responsive to said first and second signals;
   ripple carry means, connected to receive AND, OR and carry signals from said AND gate means, said OR gate means and said carry signal input means respectively, for controlling passage of AND and OR signals therethrough in response to the logic value of carry input control signals, said ripple carry means providing carry output signals;
   summing means, connected to said XNOR gate means and said carry signal input means, for receiving carry and XNOR signals whereby SUM output signal are provided in the form of carry and $\overline{carry}$ signals selectively passed by the logic value of said XNOR signals; and
   means, connected to said XNOR means, for providing XOR output signals.

2. The method of decreasing throughput time in an ALU relative to prior art approaches comprising the steps of:
   simultaneously ANDing, ORing and XNORing first and second input signals to provide AND, OR and XNOR output signals;
   logically gating AND and OR signals in accordance with carry input control signals to form carry output signals; and
   logically gating carry input signals in accordance with XNOR control signals to form SUM output signals.

3. The method of claim 2 comprising the additional step of:
   selecting one of said output signals in response to a control signal.

4. The method of decreasing throughput time in an ALU relative to prior art approaches comprising the steps of:
   simultaneously ANDing, ORing and XNORing first and second input signals to provide AND, OR and XNOR output signals;
   logically gating AND and OR signals in accordance with carry input control signals to form carry output signals; and
   logically gating carry input signals and XNOR signals in accordance with the control logic values of the other signal to form SUM output signals.

5. Arithmetic logic unit apparatus comprising, in combination:
   first signal input means;
   second signal input means;
   carry signal input means;
   AND, OR and Exclusive OR (XOR) gate means, connected to said first and second signal input means, for receiving first and second signals and providing parallel output AND, OR and XOR signals responsive to said first and second signals;
   ripple carry means, connected to receive AND, OR and carry signals from said AND gate means, said OR gate means and said carry signal input means respectively, for controlling passage of AND and OR signals therethrough in response to the logic value of carry input control signals, said ripple carry means providing carry output signals;
   summing means, connected to said XOR gate means and said carry signal input means, for receiving carry and XOR signals whereby SUM output signals are provided in the form of carry and $\overline{carry}$ signals selectively passed by the logic value of said XOR signals; and
   means, connected to said XOR means, for providing XNOR output signals.

6. Arithmetic logic unit apparatus comprising, in combination:
   first signal input means;
   second signal input means;
   carry signal input means;
   AND, OR and an exclusive signal logic combination gate means, connected to said first and second signal input means, for receiving first and second signals and providing parallel output AND, OR and third signals responsive respectively to said first and second signals;
   ripple carry means, connected to receive AND, OR and carry signals from said AND gate means, said OR gate means and said carry signal input means respectively, for controlling passage of AND and OR signals therethrough in response to the logic value of carry input control signals, said ripple carry means providing carry output signals;
   summing means, connected to said exclusive signal logic combination gate means and said carry signal input means, for receiving carry and third signals whereby one of said carry output signals and third signals are selectively passed by the logic value of the other signal.

7. Apparatus as claimed in claim 6, wherein said exclusive signal logic combination gate means is an exclusive NOR gate means and said third signals are exclusive NOR signals.

8. Apparatus as claimed in claim 6, wherein said exclusive signal logic combination gate means is an exclusive OR gate means and said third signals are exclusive OR signals.

9. Apparatus as claimed in claim 6, wherein said summing means passes the third signals which are logically controlled by the carry signals.

10. Apparatus for decreasing throughput time in an arithmetic logic unit (ALU) relative to prior art approaches comprising, in combination:

first signal input means for supplying first input signals;

second signal input means for supplying second input signals;

carry input means for supplying carry input signals from a previous stage of computation;

AND gate means, OR gate means, and exclusive signal logic combination gate means for simultaneously ADDing, ORing, and exclusive logic combining said first and second input signals to provide AND, OR and third signals respectively;

carry circuit means, including carry output means, connected to said AND gate means, OR gate means, and said carry input signal means, for logically passing the AND and OR signals in accordance with the logic value of said carry input signals, said carry circuit means providing carry output signals at said output means thereof; and SUM means, connected to said carry input means and to said exclusive signal logic combination gate means, for passing one of said carry input signals and said third signals in accordance with the logic value of the other of said carry input signals and said third signals to form SUM output signals.

11. Apparatus as claimed in claim 10 comprising, in addition:

multiplexing means connected to receive said AND signals, said OR signals, said SUM signals and said third signal, said multiplexing means including control input means and ALU apparatus output signal means; and means for supplying selection control signals to said control input means of said multiplexing means for selecting one of the signals input to said multiplexing means as an output signal from the ALU apparatus.

* * * * *